US008044789B2

(12) United States Patent
Daura Luna et al.

(10) Patent No.: US 8,044,789 B2
(45) Date of Patent: Oct. 25, 2011

(54) METHOD AND SYSTEM FOR IMPROVING THE MONITORING OF THE EXTERNAL ENVIRONMENT OF A MOTOR VEHICLE

(75) Inventors: Francesc Daura Luna, Barcelona (ES); Lorenzo Servera Serapio, Barcelona (ES)

(73) Assignee: Fico Mirrors, S.A., Barcelona (ES)

( * ) Notice: Subject to any disclaimer, the term of this patent is extended or adjusted under 35 U.S.C. 154(b) by 749 days.

(21) Appl. No.: 11/883,820

(22) PCT Filed: Feb. 3, 2006

(86) PCT No.: PCT/IB2006/000196
§ 371 (c)(1),
(2), (4) Date: Mar. 11, 2008

(87) PCT Pub. No.: WO2006/082502
PCT Pub. Date: Aug. 10, 2006

(65) Prior Publication Data
US 2009/0027185 A1    Jan. 29, 2009

(30) Foreign Application Priority Data
Feb. 4, 2005    (ES) .................................. 200500221

(51) Int. Cl.
*B60Q 1/22*    (2006.01)
(52) U.S. Cl. ...................... 340/463; 340/425.5; 340/435; 701/36; 382/103; 382/104; 382/106; 362/545; 348/148; 359/843; 359/877
(58) Field of Classification Search ................ 340/435, 340/425.5, 463; 701/36; 382/104, 103, 106; 362/545, 540, 543; 348/148; 359/843, 877, 359/844, 876
See application file for complete search history.

(56) References Cited

U.S. PATENT DOCUMENTS
5,463,384 A * 10/1995 Juds .............................. 340/903
(Continued)

FOREIGN PATENT DOCUMENTS
| CN | 1384473 | 12/2002 |
| FR | 2 687 000 | 8/1993 |
| WO | WO 2005/017554 A1 | 2/2005 |

OTHER PUBLICATIONS
International Search Report for PCT International Application No. PCT/IB2006/000196 mailed May 11, 2006.

*Primary Examiner* — George Bugg
*Assistant Examiner* — Sisay Yacob
(74) *Attorney, Agent, or Firm* — RatnerPrestia

(57) ABSTRACT

The invention relates to a method and system for improving the monitoring of the external environment of a motor vehicle. According to the invention, the vehicle comprises a built-in system for detecting objects with which it is likely to collide, within a monitored area covering a blind spot, comprising a capturing device for acquiring images that are representative of one or more objects located within said area and an electronic system for processing and analysing input signals. The inventive method comprises the automatic activation of an infrared light source in the direction of the monitored area when the images acquired cannot be processed and analysed in order to provide a result that would reliably detect a determined object and the automatic deactivation of said infrared light source when the acquired images produce the correct result without the need for infrared light. In addition, the system comprises a model with an infrared light source.

4 Claims, 1 Drawing Sheet

U.S. PATENT DOCUMENTS

| | | |
|---|---|---|
| 2002/0005778 A1* | 1/2002 | Breed et al. .................. 340/435 |
| 2002/0118282 A1* | 8/2002 | Nakamura .................... 348/148 |
| 2002/0130953 A1 | 9/2002 | Riconda et al. |
| 2002/0196639 A1 | 12/2002 | Weidel |
| 2003/0001955 A1 | 1/2003 | Holz et al. |
| 2003/0125855 A1 | 7/2003 | Breed et al. |

* cited by examiner

METHOD AND SYSTEM FOR IMPROVING THE MONITORING OF THE EXTERNAL ENVIRONMENT OF A MOTOR VEHICLE

This application is a U.S. National Phase Application of PCT Application No. PCT/IB2006/000196, filed Feb. 3, 2006.

FIELD OF THE ART

The present invention relates to a method and a system for improving the monitoring of an outside environment of a motor vehicle by means of emitting infrared light towards a surveillance area monitored by means of a detection system, for improving visibility conditions of said area.

The invention is particularly applicable to detecting large sized vehicles.

PRIOR STATE OF THE ART

Different detection systems arranged in motor vehicles are known, formed by capturing devices, such as optical sensors or cameras, and applied to detecting the entrance of objects into side areas external thereto, covering blind spots not covered by the vision provided with rearview mirrors arranged in the vehicle.

Despite the fact that such systems improve conditions, tending to prevent potential risks of colliding with other vehicles, there are problems due to poor visibility or illumination situations which such systems do not successfully resolve.

One of such situations occurs while driving at night on highways with no illumination, especially when driving alongside a large vehicle. Usually the large vehicle is first located behind the vehicle equipped with the detection system, which detects it and alerts the driver of its presence. Then, when the headlights of the large vehicle overshoot the optical sensor, the latter is rendered without light and does not "see" anything, therefore it does not activate or deactivate the alarm.

This usually does not occur when detecting smaller vehicles, since the passing maneuver time is generally short and the time delay that such detection systems generally incorporate, during which the alarm remains activated, or before they deactivate it, is sufficient to prevent these cases. With a large sized vehicle (tall and long), there is a lack of light problem because this type of vehicles are usually slow and driving alongside them can be prolonged for a rather long period of time without any alarm. In other words, the detection system confuses the presence of unlit parts of a large vehicle with the dark exterior, and therefore cannot provide correct detection.

Systems are known for solving the mentioned poor illumination problems which include an infrared light source focused towards the detection area for improving detection in poor visibility situations.

Patent application US-A-2002/0130953 relates to improving the visible spectrum (especially at night) for a camera by means of using optional sources, such as infrared sources, close to infrared, ultraviolet light, etc. The application focuses on recognizing the images captured by the camera, especially recognizing text, to aid in seeing signs at night.

Patent application US-A-2003/0125855 proposes improving detection of a CCD camera by emitting infrared waves on the detection area. The applications proposed in the application are quite varied and focused both on monitoring both the inside and outside of the vehicle, including BSD (Blind Spot Detection), but it does not relate to the problem mentioned above in relation to the difficulty of detecting large sized vehicles in poor visibility driving conditions. Nor does it propose any method for using the proposed system.

It is therefore necessary to provide an alternative to the state of the art which aids in covering the voids therein as regards the mentioned problems relating to the detection difficulties occurring in poor visibility conditions, especially when the object to be detected is a large sized vehicle.

SUMMARY OF THE INVENTION

For the purpose of solving such problems, the present invention comprises for a first, second and third aspect, a method for improving the monitoring of the external environment of a motor vehicle, of the type using a detection system to detect the presence of objects which are susceptible to collide with the mentioned vehicle, in a specific surveillance area, covering a blind spot, and said detection system comprising at least one capturing device suitable for acquiring images representative of one or more objects located within said surveillance area, such as a camera, and an electronic system with a system for processing and analyzing input signals obtained by means of said capturing device, and which generates output signals according to the result of said analysis.

The differences between the three mentioned aspects are explained below.

For said first aspect of the present invention, said method comprises automatically activating an infrared light source to emit infrared light towards the surveillance area to be covered by the capturing device when the images acquired by said capturing device don't make possible a processing and an analysis providing a result that would reliably detect a determined object, and deactivating, also automatically, said infrared light source when the electronic system determines, after processing and analyzing the images acquired by the capturing device, that a determined object within said surveillance area can be reliably detected without the need for infrared light.

This enables improving the illumination of the surveillance area so that the camera can acquire images with enough contrast to distinguish an object of the background landscape, even in cases of driving at night on highways with no illumination.

For said second aspect, the method comprises automatically activating an infrared light source to emit infrared light towards the surveillance area to be covered by the capturing device when:
  the images acquired by said capturing device don't make possible a processing and an analysis providing a result that would reliably detect a determined object, and
  furthermore when the activation of one or more turn signals of the vehicle is detected, by means of detection means included in said detection system,
  and deactivating, also automatically, said infrared light source when the electronic system determines, after processing and analyzing the images acquired by the capturing device, that a determined object within said surveillance area can be reliably detected without the need for infrared light.

Said second aspect is different from the first aspect in that the area to be covered is illuminated with infrared only when the system predicts that the driver is going to try to change lanes, and therefore there is a greater and more immediate risk of colliding. Said prediction is based on the detection of the activation of the turn signal of the vehicle, although it could be based on another type of detections indicative of such lane change attempts, such as for example in detecting the steering wheel rotation, etc.

The mentioned third aspect of the proposed method comprises:
- detecting, by means of said capturing device and said electronic system, that an object has entered said surveillance area,
- activating one of said output signals indicative of said detection, and keeping it activated while said detection is maintained,
- automatically activating an infrared light source to emit infrared light towards the surveillance area to be covered by the capturing device when the images acquired by said capturing device do not allow the electronic system to determine that a determined object within said surveillance area can be reliably detected without the need for infrared light,
- checking if, with said infrared light source activated, the device captures images and if such images are indicative that said object continues to occupy the surveillance area, and if this is not the case, deactivating at least said output signal indicative of said detection, and
- deactivating, also automatically, said infrared light source when the electronic system determines, after processing and analyzing the images acquired by the capturing device, that a determined object within said surveillance area can be reliably detected without the need for infrared light.

In other words, for the third aspect of the proposed method before activating the infrared light source, a prior detection has occurred and activated, for example, an alarm, after which it has been checked, with the infrared light activated, if the detected object continues to occupy the surveillance area or not, maintaining or deactivating, respectively, the alarm signal. The case discussed above occurs when a large vehicle, such as a truck, circulates adjacent to the vehicle incorporating the detection system, enabling the infrared detection of the end of said vehicle, i.e. the exit thereof from the detection area, which was extremely difficult, if not impossible, to do without the existence of the additional infrared light source.

The proposed method also comprises for the first three aspects of the present invention deactivating said infrared light source if, after having detected the entrance of an object in the surveillance area, the images subsequently captured by the capturing device are indicative that said object does not continue to occupy the surveillance area.

It additionally proposes also disconnecting the power of at least part of the detection system for the purpose of preventing unnecessary power consumption by elements of the system which do not need to be operative until a new detection occurs.

The poor quality, or lack of contrast, of the images can be caused by several reasons, from the lack of light due to driving at night on highways with no illumination, to other meteorological reasons, such as fog or intense rain, and also due to the invasion and complete eclipsing of the field of vision of the camera by a large sized vehicle circulating alongside the vehicle bearing the system.

The causes bringing about such poor quality of the captured images are not relevant for carrying out the proposed method, because the method is suitable for controlling said poor image quality, and therefore, the difficulty or inability of obtaining reliable detections, no matter what the cause thereof may be.

According to a fourth aspect, the present invention also relates to a system for improving the monitoring of the external environment of a motor vehicle adapted for detecting the presence of objects which are susceptible to collide with the mentioned vehicle, in a determined surveillance area, covering at least one blind spot, and said system comprising one or more capturing devices suitable for acquiring images representative of one or more objects located within said surveillance area, and an electronic system with a system for processing and analyzing input signals obtained by means of said capturing device, and which generates output signals according to the result of said analysis.

The mentioned system further comprises a module formed by at least one infrared light source and a controlled activation unit for said infrared light source, controlling different operating cycles of said infrared light source according to at least the visibility conditions of said camera, said controlled activation unit collaborating with said electronic system for automatically activating said infrared light source according to the result of said processing and analysis of said input signals.

The proposed method according to the first, second and third aspects of the present invention can be applied by means of using the proposed system.

The mentioned controlled activation unit for said infrared light source is adapted for activating said infrared light source when the detection system stops detecting said object, as well as to also do it when the images acquired by said capturing device don't make possible a processing and an analysis providing a result that would reliably detect a determined object. To that end the system for processing and analyzing is adapted for providing a result that would not reliably detect a determined object when the images acquired by said capturing device have a contrast that is under a threshold that is determined, predetermined or adjustable at will.

The proposed system further comprises for being able to apply the method proposed by the second aspect explained above, detection means to detect the activation of at least one turn signal of the vehicle, associated and in collaboration with said controlled activation unit for activating said infrared light source also according to the detection of the activation of said at least one turn signal. Other detection means for detecting that the driver of the vehicle intends to change lanes can also be included in the system, such as those comprising steering wheel rotation detectors or also the lane limiting line crossing detectors. In this last detector case, the detector is activated when the vehicle crosses over the lane limiting line when the driver has not first activated his or her turn signal, resulting in an indication of distraction or drowsiness.

The mentioned controlled activation unit for said infrared light source is adapted for deactivating, also automatically, the infrared light source when the electronic system determines, after processing and analyzing the images acquired by the capturing device, that a determined object within said surveillance area can be reliably detected without the need for infrared light. Such determination will usually be due to excessive illumination in the images, which will be indicative that the reason for the poor quality, or lack of contrast in the captured images, has ended.

Both the proposed system and the methods can be applied, as inferred from the explanation thereof, in poor visibility driving conditions, as occurs when driving at night.

The proposed method according to the first, second and third aspects of the present invention can be applied by means of using the proposed system.

It is contemplated that emitting infrared light can be both constant and intermittent at a high frequency (for the purpose of saving energy), in which case the electronic system is adapted for taking such intermittency into account by means of running a suitable algorithm.

To obtain such intermittency by means of the application of the method according to the second aspect of the present invention, arranging the infrared light source in parallel with a turn signal of the vehicle is contemplated, such that infrared light is turned on when the turn signal is activated such that the activation of the infrared light is constant (while the turn signal is activated) or with an on/off frequency that is equal to or greater than the frequency of the turn signal itself.

BRIEF DESCRIPTION OF THE DRAWINGS

The previous and other advantages and features will be better understood with the following detailed description of an exemplary embodiment depicted in the attached drawings and which must be considered in an illustrative and non-limiting manner.

An exemplary embodiment is described below in reference to the attached drawings, in which.

DETAILED DESCRIPTION OF EXEMPLARY EMBODIMENTS

With the aid of the attached drawings, the description provided below explains how to manage, with the proposed system and method, one of the many possible adverse situations, which have been explained above, that may cause malfunction of a detection system that neither incorporates nor applies the proposed system or the methods, respectively.

The circumstance that is shown relates to when a large sized vehicle, in the Figures a truck 2, is passing the vehicle 1 incorporating a detection system such as the one detailed above, i.e. with one or more capturing devices, such as optical sensors or cameras.

Figure 1:
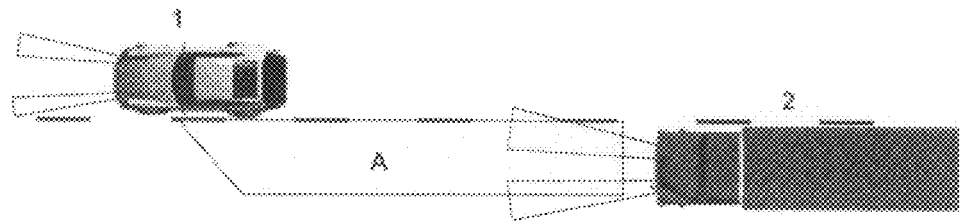
FIG. 1 shows a vehicle incorporating the system proposed by the present invention, which is subjected to a passing maneuver situation by a truck the headlights of which have invaded part of the detection area.

Usually the large vehicle 2 is first located behind the vehicle 1 equipped with the detection system, which detects it when the light beam emitted by the headlights thereof reaches the detection area A, and alerts the driver of its presence by means of activating the suitable signals. Such situation is shown in FIG. 1.

Figure 2:
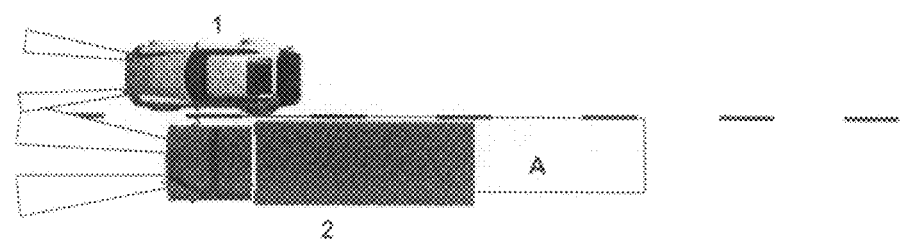
FIG. 2 shows the same passing maneuver situation of FIG. 1, but once the truck is located alongside the vehicle bearing the detection system, and occupying the detection area virtually along its entire length, and FIG. 3 also shows the same passing maneuver situation of FIGS. 1 and 2, but with the truck passing the vehicle and its rear part still occupying the detection area.

Then, when the headlights of the large vehicle 2 overshoot the optical sensor, the latter is rendered without light and does not "see" anything because the truck 2 completely invades the field of vision of the optical sensor and, therefore eclipses it and prevents the detection system from discerning the truck 2 from the landscape, since the landscape is rendered completely dark. Therefore, a conventional detection system, i.e. one which does not incorporate infrared light sources, would deactivate the alarm unless it incorporates a delay (which is common) for greater safety. Such situation is shown in FIG. 2.

However, even if conventional systems incorporate such delay, it is insufficient or is not suitably adapted for the case shown in the attached figures, because when the object to be detected is a large sized vehicle 2, the latter are usually slow and driving alongside them can be prolonged for a rather long period of time (much greater than the possible delay) without any alarm. In other words, the detection system confuses the presence of unlit parts of a large vehicle 2 with the dark exterior, and therefore cannot provide correct detection.

Figure 3:
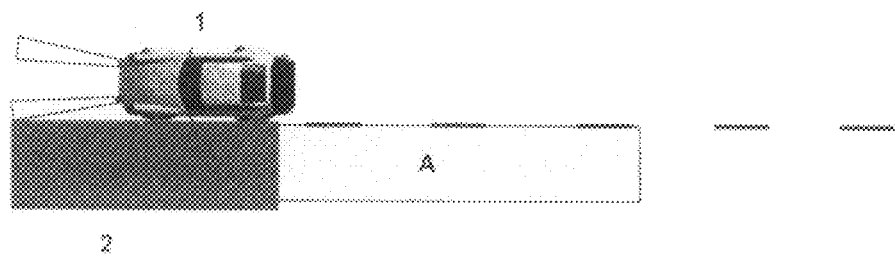

The mentioned eclipsing of the optical sensor continues to occur in the situation shown in FIG. 3, in which the rear part of the truck 2 that is passing the motor vehicle 1 continues to occupy detection area A.

By means of incorporating the proposed system according to the fourth aspect of the present invention in the motor vehicle 1 shown in FIG. 1, correct detection of the truck 2 shown in all the phases of the passing maneuver being carried out (FIGS. 1, 2 and 3) is achieved, applying the proposed method.

The following steps are carried out specifically by applying the method according to the third aspect of the invention:
  detecting, by means of said at least one capturing device, and said electronic system, that the truck 2 shown in the figures has entered said surveillance area A.
  activating an output signal, or alarm, indicative of said detection, and keeping it activated while said detection is maintained.

Said two steps correspond to the situation shown in FIG. 1.

After said detection, the mentioned eclipsing, or lack of visibility, problem occurs in the situation shown FIG. 2. At that time, the images acquired by the camera, or optical sensor, cannot be processed and analyzed in order to provide a result that would reliably detect the truck 2, so the following step is carried out:
  automatically activating an infrared light source to emit infrared light towards the surveillance area A to be covered by the device,
  checking if, with said infrared light source activated, the device captures images and if such images are indicative that said truck 2 continues to occupy the surveillance area A, which is true for the situations shown in FIGS. 2 and 3, and if it detects that the truck 2 has already left the detection area A (situation not shown), deactivating said alarm.

Finally, the proposed method comprises deactivating, also automatically, the infrared light source when the electronic system determines, after processing and analyzing the images acquired by the capturing device, that a determined object 2 in said surveillance area A can be reliably detected without the need for infrared light, i.e. when the mentioned eclipsing of the field of vision of the camera has ended. Such situation occurs when the truck 2 that is shown has already left detection area A (situation not shown), provided that there is no absolute surrounding darkness outside the motor vehicle 1.

Even though one exemplary embodiment has been described in reference to the attached figures, applying the proposed method according to its third aspect, the first and second aspects could also be applied for other exemplary embodiments in reference to the same attached figures since the activation of the infrared light source could be carried out regardless of the fact that a detection occurs (first aspect) or also according to the fact that the motor vehicle 1 activates the turn signal (second aspect).

An advantageous application of the proposed method according to the first or second aspects of the present invention, i.e. activating the infrared light source without waiting for a detection to occur, is that it occurs for an exemplary embodiment contemplating driving in a dark surrounding area (such as a tunnel) and that another vehicle circulates without its headlights on, therefore the first detection thereof would be impossible if the infrared light source (or sources) had not been previously activated. Said previous activation enables successfully managing such situations.

A person skilled in the art can introduce variations and modifications in the exemplary embodiments shown and described without departing from the scope of the present invention as it is defined in the attached claims.

The invention claimed is:

1. A method for improving the monitoring of the external environment of a motor vehicle, of the type which comprises using a detection system adapted for detecting the presence of large sized vehicles which are susceptible to collide with the mentioned vehicle, in a determined surveillance area, covering at least one blind spot, said system comprising at least one capturing device suitable for acquiring images representative of one or more objects located within said surveillance area, and an electronic system comprising at least one system for processing and analyzing input signals obtained by means of said at least one capturing device, and which generates output signals according to the result of said analysis, said method comprising carrying out the next steps sequentially:
   detecting, by means of said at least one capturing device and said electronic system, that an object has entered said surveillance area,
   activating at least one of said output signals indicative of said detection, and keeping it activated while said detection is maintained,
   automatically activating an infrared light source to emit infrared light towards the surveillance area to be covered by the capturing device, for illumination purposes, when the images acquired by said capturing device don't make possible a processing and an analysis providing a result that would reliably detect a determined object, because said surveillance area is undergoing a darkening, said infrared light source activation having the purpose of making possible to keep on detecting said object if is a large sized vehicle causing said darkening,
   checking if, with said infrared light source activated, the capturing device captures images and:
      if such images are indicative that said large sized vehicle continues to occupy the surveillance area, keeping said at least one output signal activated, and
      if such images are indicative that said large sized vehicle has already left the surveillance area, at least deactivating said output signal indicative of said detection, and
   deactivating, also automatically, said infrared light source when the electronic system determines, after processing and analyzing the images acquired by the capturing device, that a determined object in said surveillance area can be reliably detected without the need for infrared light.

2. A method according to claim 1, further comprising disconnecting the power supply of at least part of the detection system if the images captured are indicative that said object does not continue to occupy the surveillance area.

3. A method for improving the monitoring of the external environment of a motor vehicle, of the type which comprises using a detection system adapted for detecting the presence of large sized vehicles which are susceptible to collide with the mentioned vehicle, in a determined surveillance area, covering at least one blind spot, said system comprising at least one capturing device suitable for acquiring images representative of one or more objects located within said surveillance area, and an electronic system comprising at least one system for processing and analyzing input signals obtained by means of said at least one capturing device, and which generates output signals according to the result of said analysis, said method comprising carrying out the next steps sequentially:
   automatically activating an infrared light source to emit infrared light towards the surveillance area to be covered by the capturing device when the images acquired by said capturing device don't make possible a processing and an analysis providing a result that would reliably detect a determined object, because said surveillance area is undergoing a darkening, said infrared light source activation having the purpose of making possible to detect said object if is a large sized vehicle causing said darkening,
   detecting, with said infrared light source activated, by means of said at least one capturing device and said electronic system, that an object has entered said surveillance area,
   activating at least one of said output signals indicative of said detection, and keeping it activated while said detection is maintained,
   checking if, with said infrared light source activated, the capturing device captures images and:
      if such images are indicative that said large sized vehicle continues to occupy the surveillance area, keeping said at least one output signal activated, and
      if such images are indicative that said large sized vehicle has already left the surveillance area, at least deactivating said output signal indicative of said detection, and
   deactivating, also automatically, said infrared light source when the electronic system determines, after processing and analyzing the images acquired by the capturing device, that a determined object in said surveillance area can be reliably detected without the need for infrared light.

4. A method for improving the monitoring of the external environment of a motor vehicle, of the type which comprises using a detection system adapted for detecting the presence of large sized vehicles which are susceptible to collide with the mentioned vehicle, in a determined surveillance area, covering at least one blind spot, said system comprising at least one capturing device suitable for acquiring images representative of one or more objects located within said surveillance area, and an electronic system comprising at least one system for processing and analyzing input signals obtained by means of said at least one capturing device, and which generates output signals according to the result of said analysis, said method comprising carrying out the next steps sequentially:
   automatically activating an infrared light source to emit infrared light towards the surveillance area to be covered by the capturing device when:
      the images acquired by said capturing device don'make possible a processing and an analysis providing a result that would reliably detect a determined object, because said surveillance area is undergoing a darkening, said infrared light source activation having the purpose of making possible to detect said object if is a large sized vehicle causing said darkening, and
      when the activation of at least one turn signal of the vehicle by means of detection means included in said detection system is further detected,
   detecting, with said infrared light source activated, by means of said at least one capturing device and said electronic system, that an object has entered said surveillance area,
   activating at least one of said output signals indicative of said detection, and keeping it activated while said detection is maintained,
   checking if, with said infrared light source activated, the capturing device captures images and:
      if such images are indicative that said large sized vehicle continues to occupy the surveillance area, keeping said at least one output signal activated, and if such images are indicative that said large sized vehicle has already left the surveillance area, at least deactivating said output signal indicative of said detection, and deactivating, also automatically, said infrared light source when the electronic system determines, after processing and analyzing the images acquired by the capturing device, that a determined object in said surveillance area can be reliably detected without the need for infrared light.

* * * * *